(12) United States Patent
Chulinin

(10) Patent No.: US 8,971,630 B2
(45) Date of Patent: Mar. 3, 2015

(54) FAST CJK CHARACTER RECOGNITION

(75) Inventor: Yuri Chulinin, Moscow (RU)

(73) Assignee: ABBYY Development LLC (RU)

( * ) Notice: Subject to any disclaimer, the term of this patent is extended or adjusted under 35 U.S.C. 154(b) by 298 days.

(21) Appl. No.: 13/527,239

(22) Filed: Jun. 19, 2012

(65) Prior Publication Data

US 2013/0286030 A1 Oct. 31, 2013

Related U.S. Application Data

(63) Continuation-in-part of application No. 13/457,968, filed on Apr. 27, 2012, now Pat. No. 8,559,718.

(51) Int. Cl.
G06K 9/00 (2006.01)
(52) U.S. Cl.
USPC .......................................... 382/182
(58) Field of Classification Search
None
See application file for complete search history.

(56) References Cited

U.S. PATENT DOCUMENTS

| 4,706,212 | A | 11/1987 | Toma |
| 4,996,665 | A | 2/1991 | Nomura |
| 5,068,789 | A | 11/1991 | van Vliembergen |
| 5,128,865 | A | 7/1992 | Sadler |
| 5,146,405 | A | 9/1992 | Church |
| 5,175,684 | A | 12/1992 | Chong |
| 5,197,121 | A | 3/1993 | Miyoshi et al. |
| 5,268,839 | A | 12/1993 | Kaji |
| 5,301,109 | A | 4/1994 | Landauer et al. |
| 5,317,646 | A | 5/1994 | Sang, Jr. et al. |
| 5,339,412 | A | 8/1994 | Fueki |
| 5,386,556 | A | 1/1995 | Hedin et al. |
| 5,418,717 | A | 5/1995 | Su et al. |
| 5,422,743 | A | 6/1995 | Farrell et al. |
| 5,426,583 | A | 6/1995 | Uribe-Echebarria Diaz De Mendibil |
| 5,428,694 | A | 6/1995 | Betts et al. |
| 5,434,962 | A | 7/1995 | Kyojima et al. |
| 5,459,827 | A | 10/1995 | Allouche et al. |

(Continued)

FOREIGN PATENT DOCUMENTS

| EP | 2400400 | 12/2001 |
| JP | 11224346 | 8/1999 |

(Continued)

OTHER PUBLICATIONS

Bolshakov, Igor A., "Co-Ordinative Ellipsis in Russian Texts: Problems of Description and Restoration", Viniti, Academy of Sciences of USSR, Moscow, 125219, USSR, pp. 65-67.

(Continued)

*Primary Examiner* — Daniel Mariam
(74) *Attorney, Agent, or Firm* — LeighAnn Weiland; Veronica Weinstein

(57) ABSTRACT

Methods are described for determining an optimal path for creating a scheme for dividing a text line of Chinese, Japanese or Korean (CJK) characters into character cells prior to applying classifiers and recognizing characters. Gaps between characters are found as a window is moved down the text line. Finding gaps may involve finding 4-connected paths. A histogram is built based on distances from start of window to a respective gap. The window is moved to the end of each gap after each gap is found and distances measured. Process is repeated until window reaches the end of the text line and all gaps found. A linear division graph (LDG) is constructed according to detected gaps. Penalties for certain distances are applied. An optimum path is one with a minimal penalty sum and can be used as a scheme for dividing text lines into character cells.

19 Claims, 9 Drawing Sheets

(56) References Cited

U.S. PATENT DOCUMENTS

| | | |
|---|---|---|
| 5,475,587 A | 12/1995 | Anick et al. |
| 5,477,451 A | 12/1995 | Brown et al. |
| 5,490,061 A | 2/1996 | Tolin et al. |
| 5,497,319 A | 3/1996 | Chong et al. |
| 5,510,981 A | 4/1996 | Berger et al. |
| 5,550,934 A | 8/1996 | Van Vliembergen et al. |
| 5,555,101 A | 9/1996 | Larson et al. |
| 5,555,362 A | 9/1996 | Yamashita et al. |
| 5,559,693 A | 9/1996 | Anick et al. |
| 5,633,996 A | 5/1997 | Hayashi et al. |
| 5,677,835 A | 10/1997 | Carbonell et al. |
| 5,678,051 A | 10/1997 | Aoyama |
| 5,687,383 A | 11/1997 | Nakayama et al. |
| 5,696,980 A | 12/1997 | Brew |
| 5,701,500 A | 12/1997 | Ikeo et al. |
| 5,715,468 A | 2/1998 | Budzinski |
| 5,721,938 A | 2/1998 | Stuckey |
| 5,724,593 A | 3/1998 | Hargrave, III et al. |
| 5,727,220 A | 3/1998 | Hohensee et al. |
| 5,737,617 A | 4/1998 | Bernth et al. |
| 5,752,051 A | 5/1998 | Cohen |
| 5,768,603 A | 6/1998 | Brown et al. |
| 5,784,489 A | 7/1998 | Van Vliembergen et al. |
| 5,787,410 A | 7/1998 | McMahon |
| 5,794,050 A | 8/1998 | Dahlgren et al. |
| 5,794,177 A | 8/1998 | Carus et al. |
| 5,822,454 A | 10/1998 | Rangarajan |
| 5,826,219 A | 10/1998 | Kutsumi |
| 5,826,220 A | 10/1998 | Takeda et al. |
| 5,848,184 A | 12/1998 | Taylor et al. |
| 5,848,186 A | 12/1998 | Wang et al. |
| 5,848,385 A | 12/1998 | Poznanski et al. |
| 5,873,056 A | 2/1999 | Liddy et al. |
| 5,884,247 A | 3/1999 | Christy |
| 5,895,446 A | 4/1999 | Takeda et al. |
| 5,966,686 A | 10/1999 | Heidorn et al. |
| 5,999,664 A | 12/1999 | Mahoney et al. |
| 6,002,798 A | 12/1999 | Palmer et al. |
| 6,006,221 A | 12/1999 | Liddy et al. |
| 6,055,528 A | 4/2000 | Evans |
| 6,076,051 A | 6/2000 | Messerly et al. |
| 6,081,774 A | 6/2000 | de Hita et al. |
| 6,139,201 A | 10/2000 | Carbonell et al. |
| 6,182,028 B1 | 1/2001 | Karaali et al. |
| 6,223,150 B1 | 4/2001 | Duan et al. |
| 6,233,544 B1 | 5/2001 | Alshawi |
| 6,243,669 B1 | 6/2001 | Horiguchi et al. |
| 6,243,670 B1 | 6/2001 | Bessho et al. |
| 6,246,977 B1 | 6/2001 | Messerly et al. |
| 6,260,008 B1 | 7/2001 | Sanfilippo |
| 6,266,642 B1 | 7/2001 | Franz |
| 6,275,789 B1 | 8/2001 | Moser et al. |
| 6,278,967 B1 | 8/2001 | Akers et al. |
| 6,282,507 B1 | 8/2001 | Horiguchi et al. |
| 6,285,978 B1 | 9/2001 | Bernth et al. |
| 6,327,386 B1 | 12/2001 | Mao et al. |
| 6,330,530 B1 | 12/2001 | Horiguchi et al. |
| 6,345,244 B1 | 2/2002 | Clark |
| 6,356,864 B1 | 3/2002 | Foltz et al. |
| 6,356,865 B1 | 3/2002 | Franz et al. |
| 6,381,598 B1 | 4/2002 | Williamowski et al. |
| 6,400,845 B1 | 6/2002 | Volino |
| 6,456,738 B1 | 9/2002 | Tsukasa |
| 6,463,404 B1 | 10/2002 | Appleby |
| 6,470,306 B1 | 10/2002 | Pringle et al. |
| 6,512,522 B1 * | 1/2003 | Miller et al. ................. 345/474 |
| 6,562,077 B2 | 5/2003 | Bobrow et al. |
| 6,601,026 B2 | 7/2003 | Appelt et al. |
| 6,604,101 B1 | 8/2003 | Chan et al. |
| 6,657,625 B1 * | 12/2003 | Chik et al. ................. 345/467 |
| 6,658,627 B1 | 12/2003 | Gallup et al. |
| 6,661,417 B1 * | 12/2003 | Cheng ..................... 345/469 |
| 6,721,697 B1 | 4/2004 | Duan et al. |
| 6,760,695 B1 | 7/2004 | Kuno et al. |
| 6,778,949 B2 | 8/2004 | Duan et al. |
| 6,871,174 B1 | 3/2005 | Dolan et al. |
| 6,871,199 B1 | 3/2005 | Binnig et al. |
| 6,901,399 B1 | 5/2005 | Corston et al. |
| 6,901,402 B1 | 5/2005 | Corston-Oliver et al. |
| 6,928,448 B1 | 8/2005 | Franz et al. |
| 6,937,974 B1 | 8/2005 | d'Agostini |
| 6,941,521 B2 | 9/2005 | Lin et al. |
| 6,947,923 B2 | 9/2005 | Cha et al. |
| 6,957,383 B1 | 10/2005 | Smith |
| 6,965,857 B1 | 11/2005 | Decary |
| 6,983,240 B2 | 1/2006 | Ait-Mokhtar et al. |
| 6,986,104 B2 | 1/2006 | Green et al. |
| 7,020,601 B1 | 3/2006 | Hummel et al. |
| 7,027,974 B1 | 4/2006 | Busch et al. |
| 7,028,250 B2 | 4/2006 | Ukrainczyk et al. |
| 7,050,964 B2 | 5/2006 | Menzes et al. |
| 7,069,501 B2 | 6/2006 | Kunitake et al. |
| 7,085,708 B2 | 8/2006 | Manson |
| 7,106,905 B2 * | 9/2006 | Simske ..................... 382/229 |
| 7,146,358 B1 | 12/2006 | Gravano et al. |
| 7,149,347 B1 | 12/2006 | Wnek |
| 7,167,824 B2 | 1/2007 | Kallulli |
| 7,171,615 B2 | 1/2007 | Jensen et al. |
| 7,191,115 B2 | 3/2007 | Moore |
| 7,200,550 B2 | 4/2007 | Menezes et al. |
| 7,263,488 B2 | 8/2007 | Chu et al. |
| 7,269,594 B2 | 9/2007 | Corston-Oliver et al. |
| 7,310,635 B2 | 12/2007 | Tucker |
| 7,346,215 B2 | 3/2008 | Shih et al. |
| 7,346,493 B2 | 3/2008 | Ringger et al. |
| 7,356,457 B2 | 4/2008 | Pinkham et al. |
| 7,383,496 B2 | 6/2008 | Fukuda |
| 7,447,624 B2 | 11/2008 | Fuhrmann |
| 7,475,015 B2 | 1/2009 | Epstein et al. |
| 7,529,408 B2 | 5/2009 | Vohariwatt et al. |
| 7,596,485 B2 | 9/2009 | Campbell et al. |
| 7,653,921 B2 | 1/2010 | Herley |
| 7,672,831 B2 | 3/2010 | Todhunter et al. |
| 7,707,025 B2 | 4/2010 | Whitelock |
| 7,761,787 B2 | 7/2010 | Singleton et al. |
| 8,056,001 B2 | 11/2011 | Chao |
| 8,064,096 B2 | 11/2011 | Waara |
| 8,077,973 B2 | 12/2011 | Dong |
| 8,078,450 B2 | 12/2011 | Anisimovich et al. |
| 8,145,473 B2 | 3/2012 | Anisimovich et al. |
| 8,214,199 B2 | 7/2012 | Anismovich et al. |
| 8,229,730 B2 | 7/2012 | Van Den Berget et al. |
| 8,229,944 B2 | 7/2012 | Latzina et al. |
| 8,271,453 B1 | 9/2012 | Pasca et al. |
| 8,285,728 B1 | 10/2012 | Rubin |
| 8,301,633 B2 | 10/2012 | Cheslow |
| 8,402,036 B2 | 3/2013 | Blair-Goldensohn et al. |
| 8,533,188 B2 | 9/2013 | Yan et al. |
| 8,548,951 B2 | 10/2013 | Solmer et al. |
| 8,577,907 B1 | 11/2013 | Singhal et al. |
| 2001/0014902 A1 | 8/2001 | Hu et al. |
| 2001/0029455 A1 | 10/2001 | Chin et al. |
| 2002/0029232 A1 | 3/2002 | Bobrow et al. |
| 2002/0040292 A1 | 4/2002 | Marcu |
| 2002/0064316 A1 | 5/2002 | Takaoka |
| 2003/0004702 A1 | 1/2003 | Higinbotham |
| 2003/0158723 A1 | 8/2003 | Masuichi et al. |
| 2003/0176999 A1 | 9/2003 | Calcagno et al. |
| 2003/0182102 A1 | 9/2003 | Corston-Oliver et al. |
| 2003/0204392 A1 | 10/2003 | Finnigan et al. |
| 2004/0098247 A1 | 5/2004 | Moore |
| 2004/0122656 A1 | 6/2004 | Abir |
| 2004/0153465 A1 | 8/2004 | Singleton et al. |
| 2004/0172235 A1 | 9/2004 | Pinkham et al. |
| 2004/0193401 A1 | 9/2004 | Ringger et al. |
| 2004/0254781 A1 | 12/2004 | Appleby |
| 2005/0010421 A1 | 1/2005 | Watanabe et al. |
| 2005/0015240 A1 | 1/2005 | Appleby |
| 2005/0021322 A1 | 1/2005 | Richardson et al. |
| 2005/0067748 A1 | 3/2005 | Fujii et al. |
| 2005/0080613 A1 | 4/2005 | Colledge et al. |
| 2005/0086047 A1 | 4/2005 | Uchimoto et al. |
| 2005/0137853 A1 | 6/2005 | Appleby |
| 2005/0155017 A1 | 7/2005 | Berstis et al. |

(56) References Cited

U.S. PATENT DOCUMENTS

| | | |
|---|---|---|
| 2005/0171757 A1 | 8/2005 | Appleby |
| 2005/0209844 A1 | 9/2005 | Wu et al. |
| 2005/0240392 A1 | 10/2005 | Munro, Jr. et al. |
| 2006/0004563 A1 | 1/2006 | Campbell et al. |
| 2006/0080079 A1 | 4/2006 | Yamabana |
| 2006/0095250 A1 | 5/2006 | Chen et al. |
| 2006/0136193 A1 | 6/2006 | Lux-Pogodalla et al. |
| 2006/0217964 A1 | 9/2006 | Kamatani et al. |
| 2006/0224378 A1 | 10/2006 | Chino et al. |
| 2006/0293876 A1 | 12/2006 | Kamatani et al. |
| 2007/0010990 A1 | 1/2007 | Woo |
| 2007/0016398 A1 | 1/2007 | Buchholz |
| 2007/0041041 A1 | 2/2007 | Engbrocks et al. |
| 2007/0083359 A1 | 4/2007 | Bender |
| 2007/0100601 A1 | 5/2007 | Kimura |
| 2007/0133067 A1 | 6/2007 | Garg |
| 2007/0168382 A1 | 7/2007 | Tillberg et al. |
| 2008/0002893 A1 | 1/2008 | Vincent et al. |
| 2008/0025608 A1 | 1/2008 | Meunier |
| 2008/0170786 A1 | 7/2008 | Tomizawa et al. |
| 2008/0195968 A1 | 8/2008 | Schacht |
| 2009/0028437 A1 | 1/2009 | Hirohata |
| 2009/0074296 A1 | 3/2009 | Filimonova et al. |
| 2011/0043528 A1* | 2/2011 | Solomonov et al. .......... 345/467 |
| 2011/0055188 A1 | 3/2011 | Gras |
| 2011/0301941 A1 | 12/2011 | De Vocht |
| 2012/0023104 A1 | 1/2012 | Johnson et al. |
| 2012/0030226 A1 | 2/2012 | Holt et al. |
| 2012/0131060 A1 | 5/2012 | Heidasch et al. |
| 2012/0197885 A1 | 8/2012 | Patterson |
| 2012/0203777 A1 | 8/2012 | Laroco, Jr. et al. |
| 2012/0221553 A1 | 8/2012 | Wittmer et al. |
| 2012/0246153 A1 | 9/2012 | Pehle |
| 2012/0296897 A1 | 11/2012 | Hin-Jing et al. |
| 2013/0013291 A1 | 1/2013 | Bullock et al. |
| 2013/0054589 A1 | 2/2013 | Cheslow |
| 2013/0091113 A1 | 4/2013 | Gras |
| 2013/0138696 A1 | 5/2013 | Turdakov et al. |
| 2013/0185307 A1 | 7/2013 | El-Yaniv et al. |
| 2013/0254209 A1 | 9/2013 | Kang et al. |
| 2013/0282703 A1 | 10/2013 | Puterman-Sobe et al. |
| 2013/0311487 A1 | 11/2013 | Moore et al. |
| 2013/0318095 A1 | 11/2013 | Harold |
| 2014/0012842 A1 | 1/2014 | Yan et al. |

FOREIGN PATENT DOCUMENTS

| | | |
|---|---|---|
| JP | 2004355528 | 12/2004 |
| WO | 2011160204 | 12/2011 |

OTHER PUBLICATIONS

Hutchins, "Machine Translation: Past, Present, Future", 1986, New York: Halsted Press, Chapters 1, 3 and 9, pp. 1-36.

* cited by examiner

Fall Down Seven Times, Get up Eight

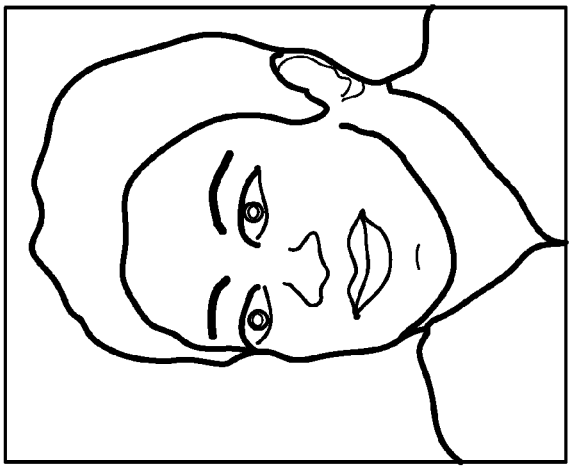

Handmade Search Engine by Grope

<My goal was supposed to be a math teacher, however, I ended up to be hired by a personal computer company.>

Taking programing classes in my college and purchasing a microcomputer seemed to be a trigger for working with a computer. One day, when I got news that a new, high performance computer had been on r sale, I chose the computer company as a part time job. The job was to answer to customer's questions in the show room, and I was allowed to use those computers anytime when I had nothing to do.

"You soon get tired of one thing. I wonder how you can keep taking care of high school students by three years as a teacher", one day an executive of the company said, which made me sense certainly.
Then, I made a decision to get a job in the company.It was a small venture business where I was working for. While working there being given a lot of different roles at the developmental fields, every day was absolutely fulfillment for me. The company was happened to be sold by TOSHIBA, Inc., when it was my tenth year. If you work for a corporation, your goal should be getting a position as "president". However, TOSHIBA had more than thirty executives; many of them were so smart people, it was totally impossible for me to be the president.

Born in Tokyo in 1957. Graduate from Tokyo University of Science in 1979, got employed by Sword Machine Systems. Moving to Soft Bank Laboratory, Soft Bank, then funded Yahoo Inc, in January 1996. President & CEO Yahoo Inc from January 1996. Jazz music and reading science fiction as hobby and interest. His current favorite is "Perry Rhodan Universe Hero", which has been written by multiple writers novel relay in Germany.

FAST CJK CHARACTER RECOGNITION

CROSS-REFERENCE TO RELATED APPLICATIONS

For purposes of the USPTO extra-statutory requirements, the present application constitutes a continuation-in-part of U.S. patent application Ser. No. 13/457,968 that was filed on 27 Apr. 2012, now U.S. Pat. No. 8,559,718, or is an application of which a currently co-pending application is entitled to the benefit of the filing date.

The United States Patent Office (USPTO) has published a notice effectively stating that the USPTO's computer programs require that patent applicants reference both a serial number and indicate whether an application is a continuation or continuation-in-part. See Stephen G. Kunin, Benefit of Prior-Filed Application, USPTO Official Gazette 18 Mar. 2003. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant is designating the present application as a continuation-in-part of its parent applications as set forth above, but expressly points out that such designations are not to be construed in any way as any type of commentary and/or admission as to whether or not the present application contains any new matter in addition to the matter of its parent application(s).

All subject matter of the Related Applications and of any and all parent, grandparent, great-grandparent, etc. applications of the Related Applications is incorporated herein by reference to the extent such subject matter is not inconsistent herewith.

FIELD

The present invention is related to functions traditionally associated with text pre-processing and optical character recognition (OCR) and specifically to isolating and identifying handwritten and printed Chinese, Japanese and Korean (CJK) characters, glyphs or tetragraphs in images of documents containing CJK and other types of glyphic characters including documents compounded with characters of another language.

BACKGROUND

A document to be processed by OCR is initially and usually presented as an electronic image obtained from a camera, a scanner, or from conversion from one file format to another. In document processing, OCR is typically performed automatically or semi-automatically by a software program or a program module executed on a personal, mobile or other computer. However, there are many barriers to successful OCR, or OCR processing with a high degree of successful recognition, especially when attempting to recognize CJK and other types of glyphic characters.

Documents written by CJK speakers include characters of one or more glyphic languages and increasingly include non-standard characters (e.g., letters, symbols, numeral, punctuation marks) from one or more other languages including European languages. Such other non-CJK languages are generally based on a Latin, Cyrillic or other non-glyphic alphabet. Herein, reference is made to CJK characters, but such reference is shorthand for all varieties of glyphs, characters, tetragraphs, tetragrams, symbols, ideographs, ideograms and the like.

Written or printed text in a European language usually consists of repeated use of 100-150 standardized characters to form phonetic words. In contrast, texts in CJK languages usually use a subset of 30,000-40,000 available characters. A typical person routinely exposed to CJK characters encounters about 5,000 different CJK characters per day. Because of this characteristic of CJK and other glyph languages, it is difficult or impossible to recognize CJK texts by ordinary methods and techniques used in the recognition of characters and words in Roman, Latin or Cyrillic alphabets.

Among other factors, a set of patterns for recognition of CJK characters typically contains more than 40,000 patterns. Every time this set is used to recognize an unidentified or unrecognized CJK character, a load on the recognizing computer system is substantial and overall recognition time increases dramatically.

FIG. 1 is an example of an image of a document 100 that includes CJK text 102 (Japanese) in a horizontal direction and CJK text in a vertical direction. The CJK text 102 also includes Roman characters mixed with the CJK characters. The document 100 also includes a region 104 with a portrait or picture and a caption under the picture. FIG. 2 is an English translation 200 of the CJK text of FIG. 1. If blindly recognizing each of the Japanese characters, a computer system, on average, would have to evaluate each character with half of 40,000 available Japanese patterns—assuming the computer system was told that the characters were Japanese.

To complicate matters, other difficulties in processing are often present. One difficulty arises when alphanumeric and other non-CJK characters are mixed into traditional CJK writing. Another difficulty arises when the direction of writing cannot easily be ascertained. CJK writing often does not include any punctuation. CJK writing may be in different directions on a single page or in single region of text. Further difficulties can arise when both traditional and simplified CJK characters are mixed together, as is often the case in formal printed publications.

There are various methods of attempting to overcome the difficulties in recognizing CJK characters. Analytically, recognition can generally be divided into two types of methods. The first type is by recognizing each character as it is being written—a form of online or active recognition. This type of recognition often involves analyzing strokes as they are entered by a stylus or finger on a touch-sensitive screen.

The second type of recognition involves segmenting individual CJK characters on each page of a document and then recognizing each character by matching it to a character in a database of characters. This type of recognition is termed offline recognition, and can be divided into handwritten character recognition (HCR) and printed character recognition (PCR). In each of these types of offline recognition, feature matching and/or structural analysis is performed. The techniques described herein apply to both HCR and PCR recognition, and generally to all types of offline and online recognition of CJK characters.

CJK characters generally occupy a square area in which the components or strokes of every character are written to fit. This technique allows CJK characters to maintain a uniform size and shape, especially with small printed characters in either sans-serif or serif style. The uniform size and shape allows dense printing of such CJK characters. However, the dense printing can be a source of trouble for segmenting and recognizing CJK characters, lines and paragraphs. There are many ways that segmenting, recognition and processing of CJK characters can be improved.

SUMMARY

Embodiments and techniques described herein include improved methods for reducing the processing time for recognizing CJK and other types of glyphic characters.

One implementation includes selecting or calculating a window width for a text line of CJK characters or CJK text. The window is at least as tall as the characters in the isolated text line. The beginning of the window is matched to the beginning of the text line and gaps falling in the window are detected. One way to find the gap is to identify a location in the window that is a 4-connected path that is purely vertical where contiguous white pixels are located directly one above another. A distance (e.g., in pixels) from the beginning of the window to each pixel belonging to the gap is calculated. A histogram is built based on these distances. The window is moved to the end of the first found gap and the process is repeated until the window reaches the end of the text line and all gaps in the text line are found.

Next, a linear division graph (LDG) is constructed according to the detected gaps. A histogram of character widths for the given line is obtained. A maximum or desired point in the histogram is found. In a neighborhood of the maximum, an area in the histogram is selected so that the height of each column in the selected area is at least a predefined part of the maximal height. Every column outside of this selected area is considered as a "small" penalty of the LDG arc. This area of small penalties is typically the character width for a given line. "Special" penalties for the LDG arcs are also used as described more fully below.

Next, paths of the LDG are found, and a sum of the penalties for each path is calculated. The path with the minimal penalty sum is chosen or selected as an optimal path. The optimal path may be considered as a scheme for dividing a text line into character cells.

Next, the line can be divided into individual or isolated images (likely) containing a single CJK character, one character per image. Two, three, or maybe more of these images may be loaded into a computer cache. Subsequently, loaded images can be recognized at substantially the same time such as in a batch. Only one launch of a set of CJK patterns is needed to recognize two, three, or maybe more characters processed as a batch.

Other details and features will be apparent from the detailed description.

BRIEF DESCRIPTION OF THE DRAWINGS

While the appended claims set forth the features of the present invention with particularity, the invention, together with its objects and advantages, will be more readily appreciated from the following detailed description, taken in conjunction with the accompanying drawings. Throughout, like numerals refer to like parts with the first digit of each numeral generally referring to the figure which first illustrates the particular part.

FIG. 2 is an English translation of the CJK text of FIG. 1.

DETAILED DESCRIPTION

In the following description, for purposes of explanation, numerous specific details are set forth in order to provide an understanding of the invention. It will be apparent, however, to one skilled in the art that the invention can be practiced without these specific details. In other instances, structures and devices are shown only in block diagram form in order to avoid obscuring the invention.

Reference in this specification to "one embodiment" or "an embodiment" means that a particular feature, structure, or characteristic described in connection with the embodiment is included in at least one embodiment of the invention. Appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Broadly, embodiments and techniques of the present invention disclose or relate to methods for defining a layout of text lines containing Chinese, Japanese, Korean (CJK) and European characters. Reference may be made to a text "line," but also could refer to a word, paragraph, section and page. Similarly, while reference may be made to CJK characters, other terms may be used to mean CJK characters including glyphs, ideographs, tetragraphs, symbols and the like, and vice versa—use of CJK characters may be used to mean glyphs, ideographs, tetragraphs, symbols and the like. The embodiments and techniques described herein apply to all types of offline and online (active) recognition of CJK characters.

Unless stated otherwise, glyphic languages include Chinese (traditional and simplified), Japanese and Korean writings as well as any other written language that is not represented by a relatively simple or small alphabet. Reference is made to CJK characters and is shorthand for all varieties of glyphs, characters, tetragraphs, tetragrams, symbols, ideograms and the like. The embodiments and techniques are generally for isolating individual characters or groups of characters (e.g., paragraphs, lines, words and individual glyphs) for further processing associated with one or more recognition or OCR techniques. The present disclosure uses the following terms.

Figure 3:
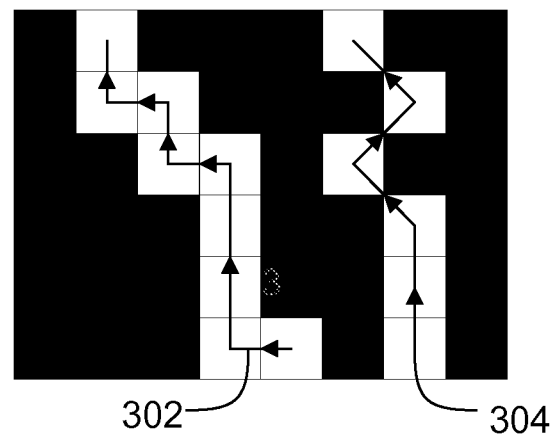
FIG. 3 shows an example of a 4-connected path 302 and a non-4-connected path 304.

A "4-connected path" is a set of pixels continuously connecting one point in an image with another point in the image, thereby every intermediate pixel borders with the previous one, on one of the four sides, and with the next one, on one of the three remaining sides. FIG. 3 shows an example of a 4-connected path 302 and a non-4-connected path 304.

Figure 4:
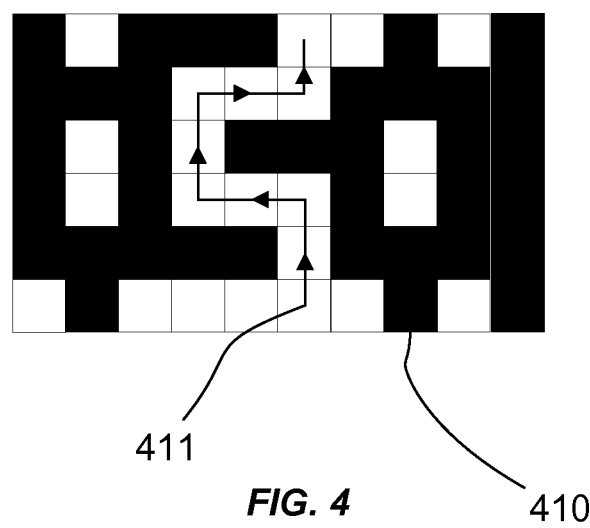
FIG. 4 shows an example of a gap 411 in the text string 410.

A "gap" is a space within a text line for which there is at least one 4-connected path in the text line between the highest (top) and the lowest (bottom) pixel of the text line. FIG. 4 shows an example of a gap 411 in a string of characters 410.

A "linear division graph" or LDG is a graph that could be constructed by a computer OCR system while recognizing a line of characters. The nodes of this graph are the gaps found within the text line—generally between each (future-recognized) character.

An "arc" of the graph is a hypothesis that there is a character between any two given gaps. Each arc of the graph is characterized with a numerical parameter (or optionally multiple numerical parameters) denoting a probability that the hypothesis is true.

A "cache" is a portion of the computer memory facilitating operations involving data associated with recognizing CJK and other types of characters. A volume of the cache may be relatively small in comparison to other portions of computer memory.

A "classifier" is a programming module capable of calculating a predefined feature or a set of features for a given image fragment. A classification result generally is an estimation of probability of encountering a particular character within the given image fragment—the image fragment undergoing analysis by the classifier.

A "pattern" is a certain formal criterion of the image being similar to a certain character. For example, for the character "L" a pattern could be: "two lines coming together at a right angle in the left lower corner of an image." Each pattern can be previously "learned" for providing an acceptable or good correspondence to its character. The classifiers use patterns during recognition. In a preferred implementation, a recognition software program has available many patterns of different characters in one or more languages.

A "window" is an imaginary defined (and generally) rectangular frame with height of the frame generally equal to the height of the line of text or line of characters. The width and location of the window on the line can be different on each step of line processing, and with each particular line.

A "feature" is a mathematical function computed on a certain image fragment. A feature type and set of calculated features can be predefined. A feature may also take its ordinary meaning when referring, for example, to a "feature" of a character.

An "LDG path" is a sequence of arcs connecting the beginning and the end of a line of text (a true end, or a stopping point) and contains one or more sets of LDG nodes where an LDG node generally correlates with a gap between characters. In other words, LDG path is a variant of dividing a text line into characters at LDG nodes.

A "text line" generally is a rectangle consisting of pixels which includes images of characters in the text line that are destined to be recognized.

A "CJK line" is a text line corresponding to a text fragment containing only CJK characters (e.g., tetragraphs, glyphs).

A "mixed line" is a line corresponding to a text fragment containing both CJK characters and non-glyphic characters (e.g., Arabic numerals, Latin letters, punctuation marks). Examples of mixed lines can be seen in FIG. 1.

Before starting a recognition process, an initial image of a document (such as the one shown in FIG. 1) may be pre-modified, for example, by being binarized (transformed into 1-bit color space), deskewed, etc. The initial image also may be pre-analyzed in order to identify the following non-exclusive list of information: (1) a language or a set of languages of the text on the image; (2) geometrical parameters (e.g., length and height) of each image block containing a text line; and (3) absolute or relative coordinates of each image block containing a text line (e.g., relative coordinates of the upper left corner of each image block containing a text line with respect to the upper left corner of the initial image of the document).

Figure 5:
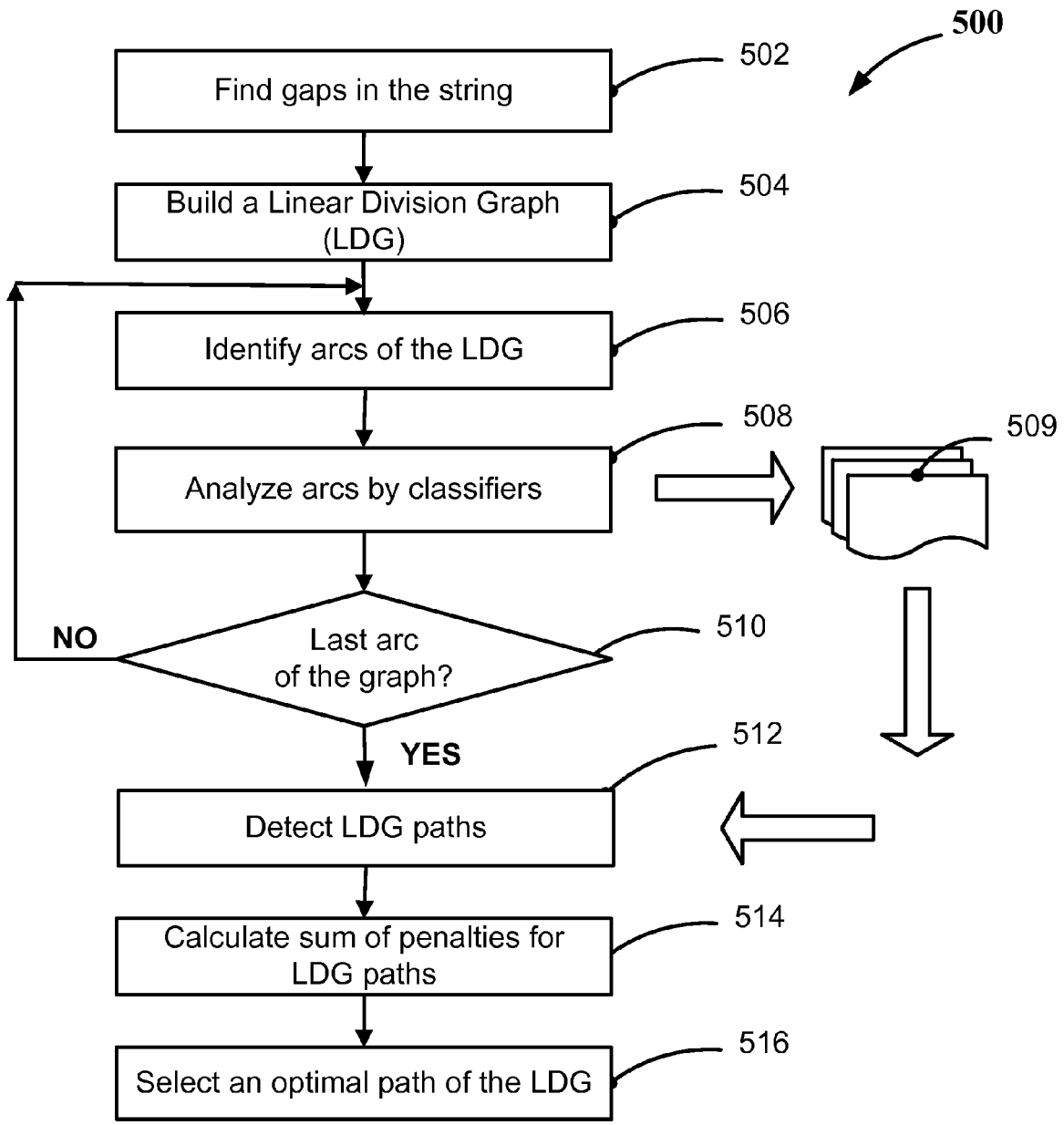
FIG. 5 shows a flowchart of operations to define a layout of an image of CJK text by a method usable for texts in European and other similar languages.

FIG. 5 is a flowchart 500 of operations to define a layout of an image of text strings by a method used for texts in European languages. Referring to FIG. 5, at step 502, gaps in the text line to be processed are detected. Then, at step 504 a linear division graph (LDG) is constructed according to the detected gaps. Next, arcs of the LDG are identified 506. Image fragments corresponding to all LDG arcs, turn by turn, are passed to a set of classifiers 508 for analysis. The result of each turn is a set of hypotheses 509.

After the last turn of the processing cycle (steps 506 and 508), each arc of the LDG receives a penalty according to estimation and hypotheses selected by the classifiers 508.

After penalties are calculated for all arcs in the LDG (510), LDG paths are detected 512, and a sum of the penalties for each of the paths is calculated 514. Finally, at step 516, the path with the minimal sum of penalties is selected as an optimal path.

The optimal path is considered a scheme for dividing a text line into character cells or positions. This optimal path is a result of text line recognition or processing. In other words, dividing a text line into character cells could be considered a part of the recognition process.

The method described in FIG. 5 works well for texts in European languages which usually consist of about 100-150 different or possible characters. In contrast, texts in CJK languages usually consist of about 30,000 to 40,000 different or possible characters and, correspondingly, these CJK texts need to use a set of 30,000 to 40,000 patterns. However, this is computationally expensive. It is difficult to use the method described in FIG. 5 because of the requirement to use a huge number of CJK patterns (e.g. a set of 40,000 patterns). Moreover, the method described in FIG. 5 has the following drawbacks.

First, the method requires calculation or determination of a large number of LDG arcs. It is not possible to obtain a probability value for an LDG arc until the classifier processes all of the previous LDG arcs, i.e., those that connect the beginning of a line with its corresponding gap (the gap where the arc starts or ends). As a result, it is impossible to obtain the layout before running the classifier set. This is computationally expensive.

Second, it is impossible to define the line content before running the classifier, i.e., it is usually impossible to estimate or detect in advance if the line is mixed or contains only CJK characters. As a result, it is necessary to use both "European" and "CJK" pattern sets for each LDG arc.

Third, it is highly probable to encounter cases of incorrect dividing of a text line into character cells (positions for lines mixed with both Roman and CJK characters).

The method of the present invention overcomes the listed drawbacks. It provides significant acceleration of the OCR system, demands fewer computational resources and yields significantly fewer misrecognized characters.

Figure 6:
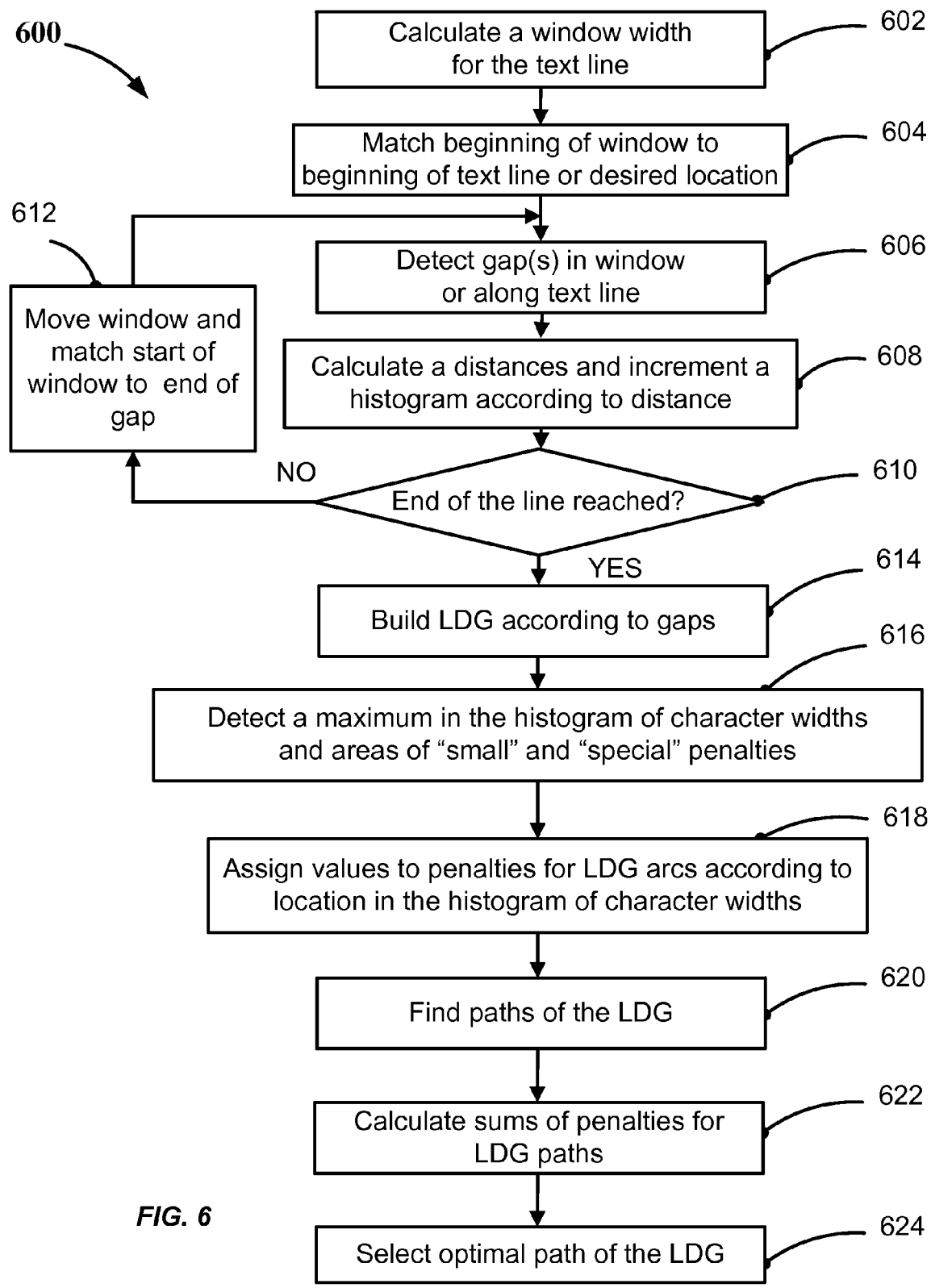
FIG. 6 shows a flowchart of operations to define a layout of an image of CJK text in accordance with an embodiment of the invention.

FIG. 6 shows a flowchart 600 of preferred operations to define a layout of the image of text strings in accordance with an embodiment of the invention when processing CJK texts.

At first, a window width is selected 602 such as by a function of a given text line height and as a function of a set of defined recognition languages. A window width is language-independent. For example, if the height of the line of Chinese glyphs is about 120 pixels then a window width is about 3 by 120 or about 360 pixels. The width of the window may depend on a line height or a font size, or may be chosen based on the same. A font size can be different on different lines or in different documents.

A histogram of character cell widths is a histogram showing frequencies of encountering a gap at a certain distance from the beginning of a window. The more frequent (stronger indication) the gap (N pixels distant from the beginning of the window), the higher the N's column. Then, the text line is analyzed as follows.

The beginning of the window is matched to the beginning of the text line 604, and gaps falling in the window (i.e., located within the window's width) are detected 606. One way to find the gap is to identify a location in the window that is a 4-connected path that is purely vertical where contiguous white pixels are located directly one above another.

A distance (e.g., in pixels) from the beginning of the window to each pixel belonging to the gap is calculated. Columns of the histogram corresponding to the found distances are incremented 608.

In the next iteration (if the end of the line is not reached 610), the window is moved and the beginning of the window is matched to the end of the found gap 610. Steps 606, 608 and 610 may be repeated until the window reaches the end of the text line 610 and all the gaps in the text line are found.

Then, at step 614, a linear division graph (LDG) is constructed according to the detected gaps.

A histogram of character widths for the given line is obtained. A considerable, obvious or pronounced maximum (or maxima) in the histogram is detected 616. In a neighborhood of the maximum, a histogram area is selected so that the height of each column in the selected area is at least a predefined part of the maximal height. Every column outside of this selected area is considered as a "small" penalty of the LDG arc with the height corresponding to this column. This area of small penalties is considered hereafter as a confirmed estimation of a typical character width for a given line.

Histogram columns that are outside of the selected area hereafter are considered as "special" penalties of the LDG arcs with the height corresponding to these columns. The value of a special penalty directly depends on the distance of the corresponding arc from the baseline of the window of CJK text. Maximal special penalties correspond to the columns with maximal distances from the beginning of the window to the gap.

In a preferred implementation, every LDG arc depending on its length is assigned a small or a special penalty according to the histogram of the character widths 618.

Next, the paths of the LDG are found 620, and a sum of the penalties for paths is calculated 622. LDG paths with transitions from "small" to "special" penalties or vice versa are additionally penalized for each such transition. The path with the minimal penalty sum is chosen or selected as an optimal path 624. Hereafter the optimal path is considered as a scheme for dividing a text line into character cells.

In other embodiments, another criteria system can be used instead of penalties to find an optimal path on the basis of highest probabilities.

As an additional benefit of using the described implementation, if the optimal path does not contain lines with a "special" penalty, the line layout with highest probability contains only CJK characters.

If the optimal path contains arcs with "special" penalties, the line fragments corresponding to these arcs with high probability contain characters that are not CJK characters (e.g., Arabic numerals, punctuation marks, Latin characters).

The results related to both line layout and preliminary interpretation of the characters contained there, are obtained without any traditional recognition of a character and without using any classifier.

There are many advantages associated with the above-described method. For example, there are fewer LDG arcs than in alternative methods such as the one shown in FIG. 5. Further, probability estimation (i.e., penalty or "special" penalty) for every LDG arc can be obtained without any classifier. The described method provides fully a priori (without recognition of a character) text line layout and identification of character cells. The method enables obtaining a verified value of a typical character cell width for a given text line. The method also enables a program to define with high probability whether the text line is mixed or contains only CJK characters before starting a character classifying process. The method saves computational resources of a computer by starting only those patterns that are necessary to recognize the given text. Therefore, it significantly accelerates the character recognition process for CJK texts. The method reduces to a negligible quantity the probability of errors when the arcs of the CJK text lines in a LDG with the maximal probability values do not correspond to real or actual character locations. The method significantly reduces the probability of encountering a situation where the arcs with the maximal probability values correspond to the CJK characters, when these places in the initial text contain characters of a European alphabet.

Figure 1:
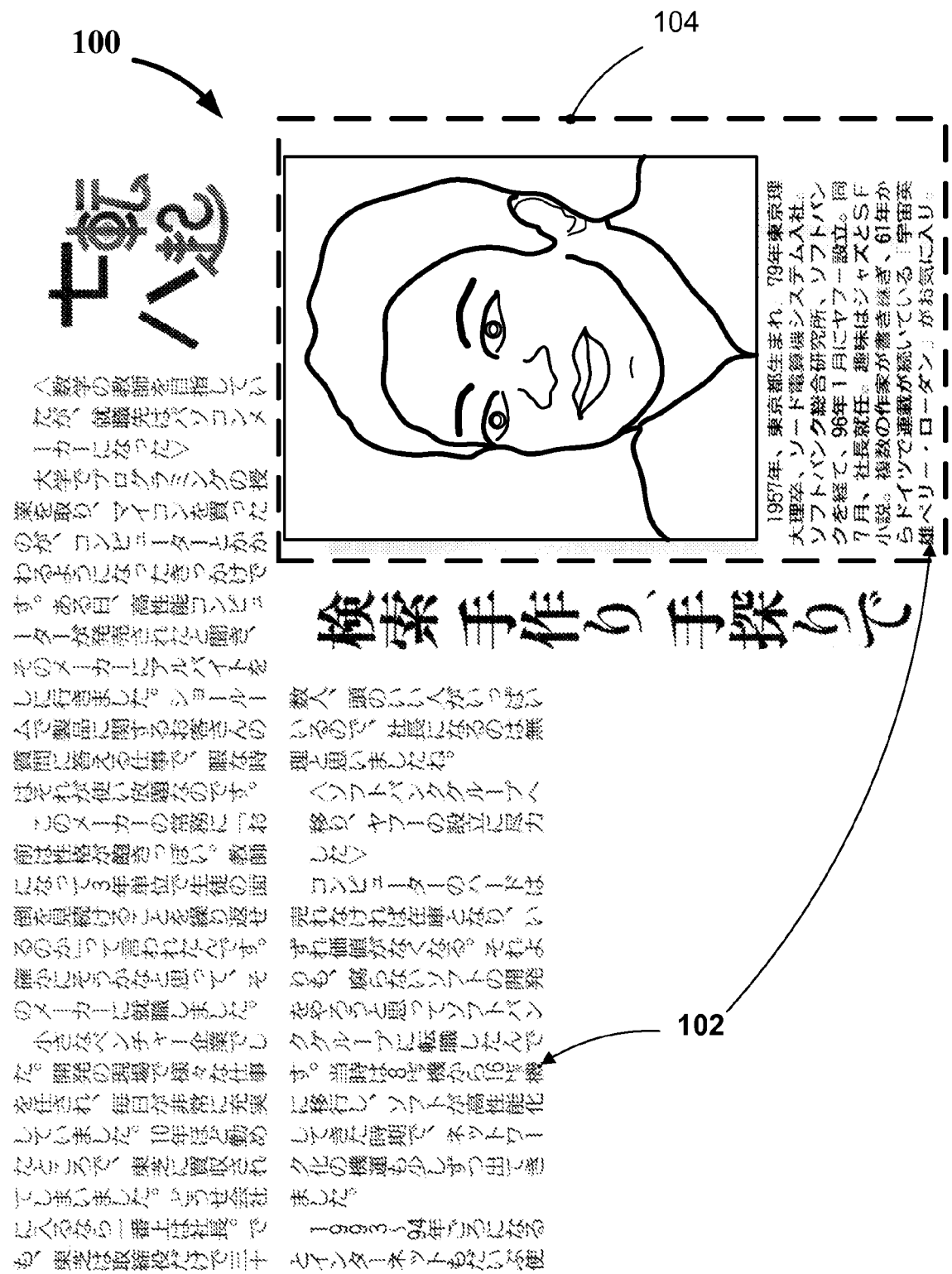
FIG. 1 is an example of an image of a document of CJK text 102 (Japanese) mixed with a few Roman characters.
Figure 7:
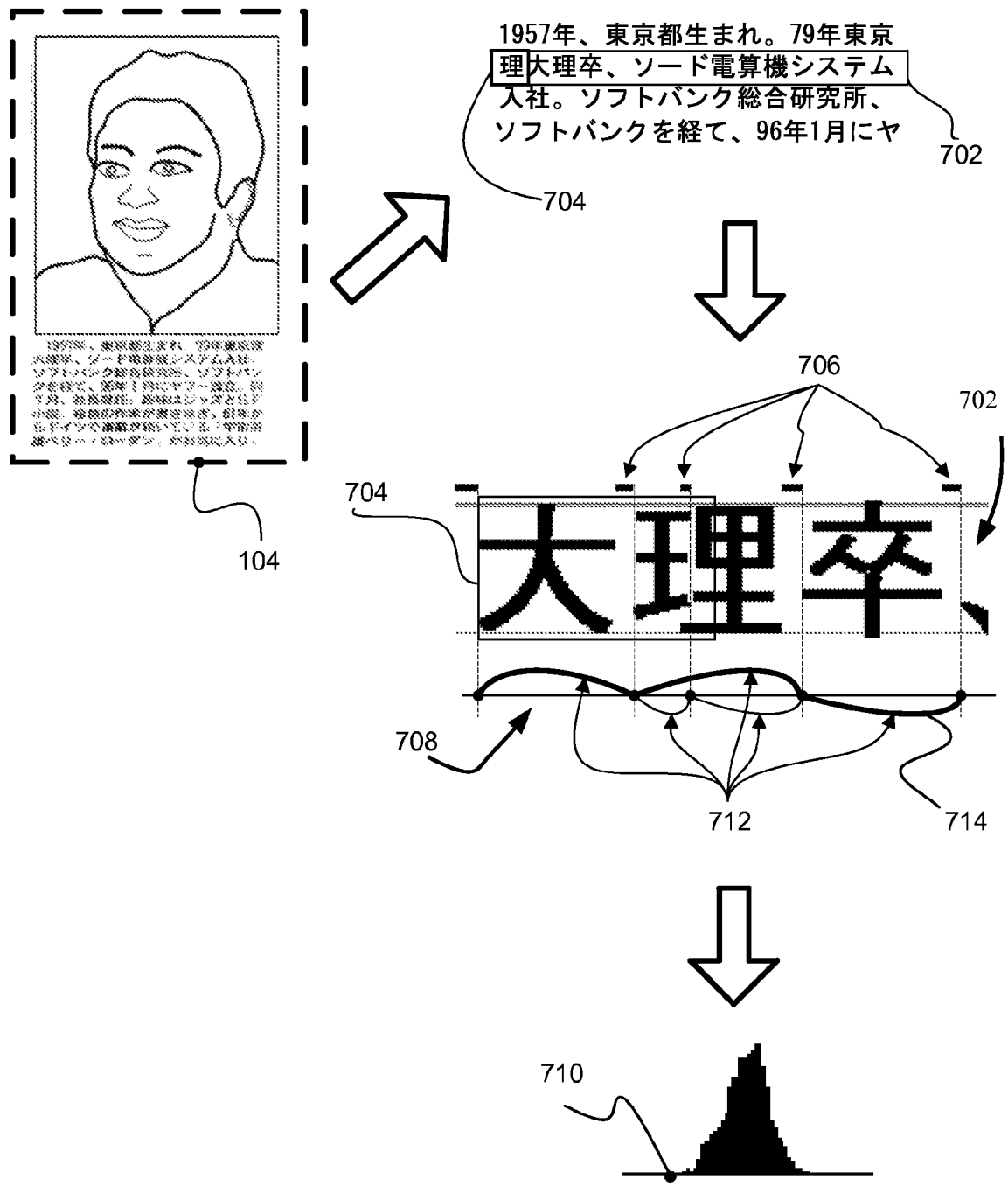
FIG. 7 shows an overview of the process shown in FIG. 6 with a portion of the image shown in FIG. 1.

FIG. 7 shows an overview of the process shown in FIG. 6 with a portion of the image shown in FIG. 1. With reference to FIG. 7, a portion of the caption under the portrait is identified. One row or line of text 702 is identified for processing. A window 704 is placed or oriented at a desired or starting place along the line of text 702. Gaps 706 are detected or identified in the line of text 702. Distances are calculated from starting points (a first side of a window 704) to the respective gap or gaps 706 (e.g., those within the window 704, or along the line of text 702). These values are tabulated into a histogram 710. LDG 708 is build according to the gaps 706. Arcs 712 are generated and penalties are applied to the arcs where the penalties are related to the maxima in the histogram 710. Next, paths are found. An optimal path 714 (bold arcs on the drawing) is selected from a plurality of paths.

An optimal path 714 can be selected from a numerical analysis of the line of text 702.

Figure 8:
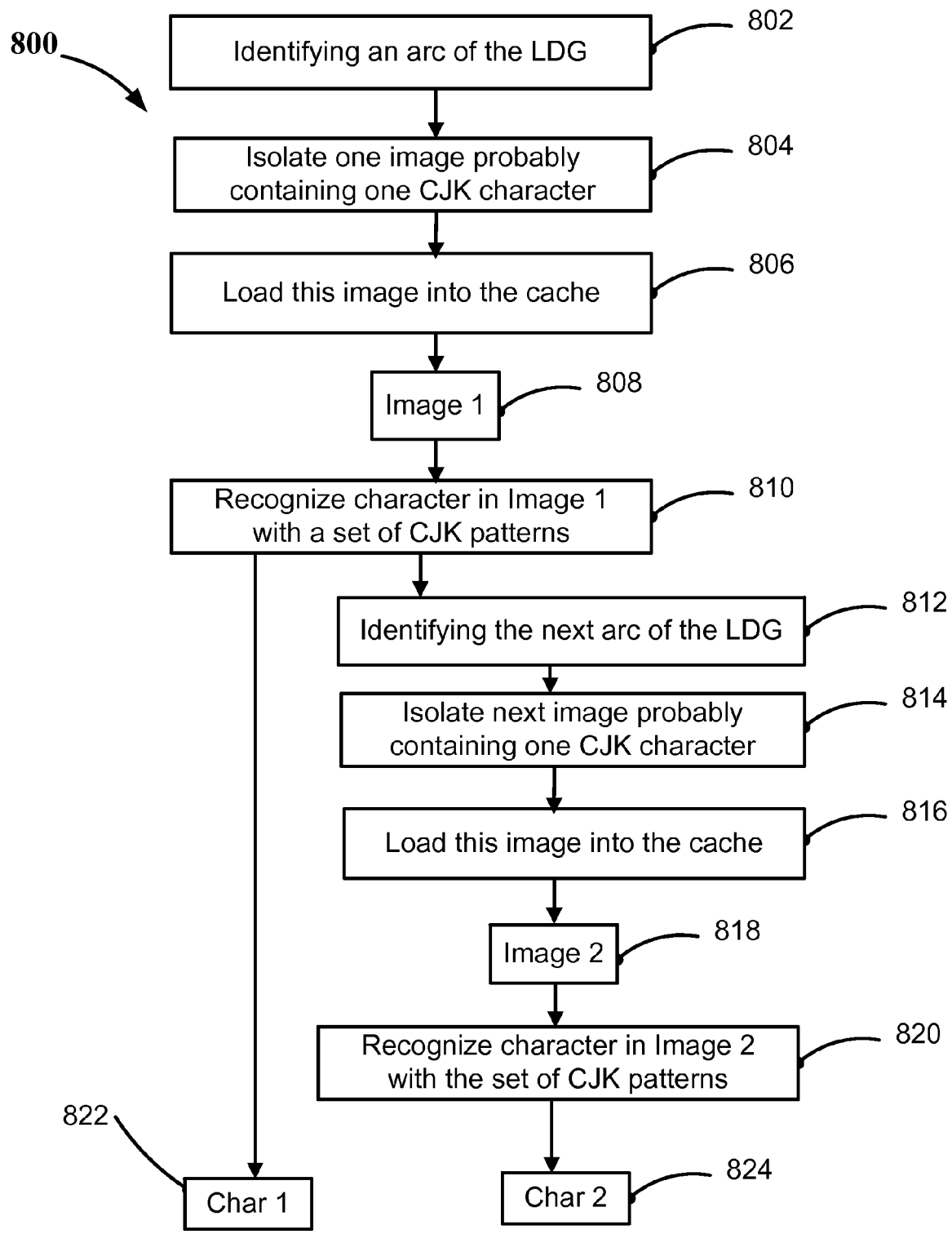
FIG. 8 shows a flowchart of an exemplary implementation of a method for recognizing CJK characters.

FIG. 8 shows a flowchart 800 of a method or series of operations to recognize CJK characters in accordance with the method shown in the flowchart 500 of FIG. 5. FIG. 8 is a view of substantially simultaneously recognizing two characters without recognizing characters in a batch such as shown in FIG. 9.

With reference to FIG. 8, the method includes identifying an arc of the LDG 802 in accordance with step 506 of FIG. 5. Then, at step 804, one image probably containing one CJK character is isolated 804 from the line. Next, this image is loaded 806 into the computer cache. Then, the image 808 is recognized 810 with the set of CJK patterns (in accordance with step 509). A recognized character 822 is a first result of the recognition.

Next, at step 812, a next image probably containing one CJK character is isolated 814 from the line. This image is loaded 816 into the computer cache. Then, the image 818 is recognized 820 with the set of CJK patterns (in accordance with step 509). A second recognized character 824 is a second result of the recognition. In FIG. 8, the set of CJK patterns is used twice 810 and 820, which makes computation slower.

Figure 9:
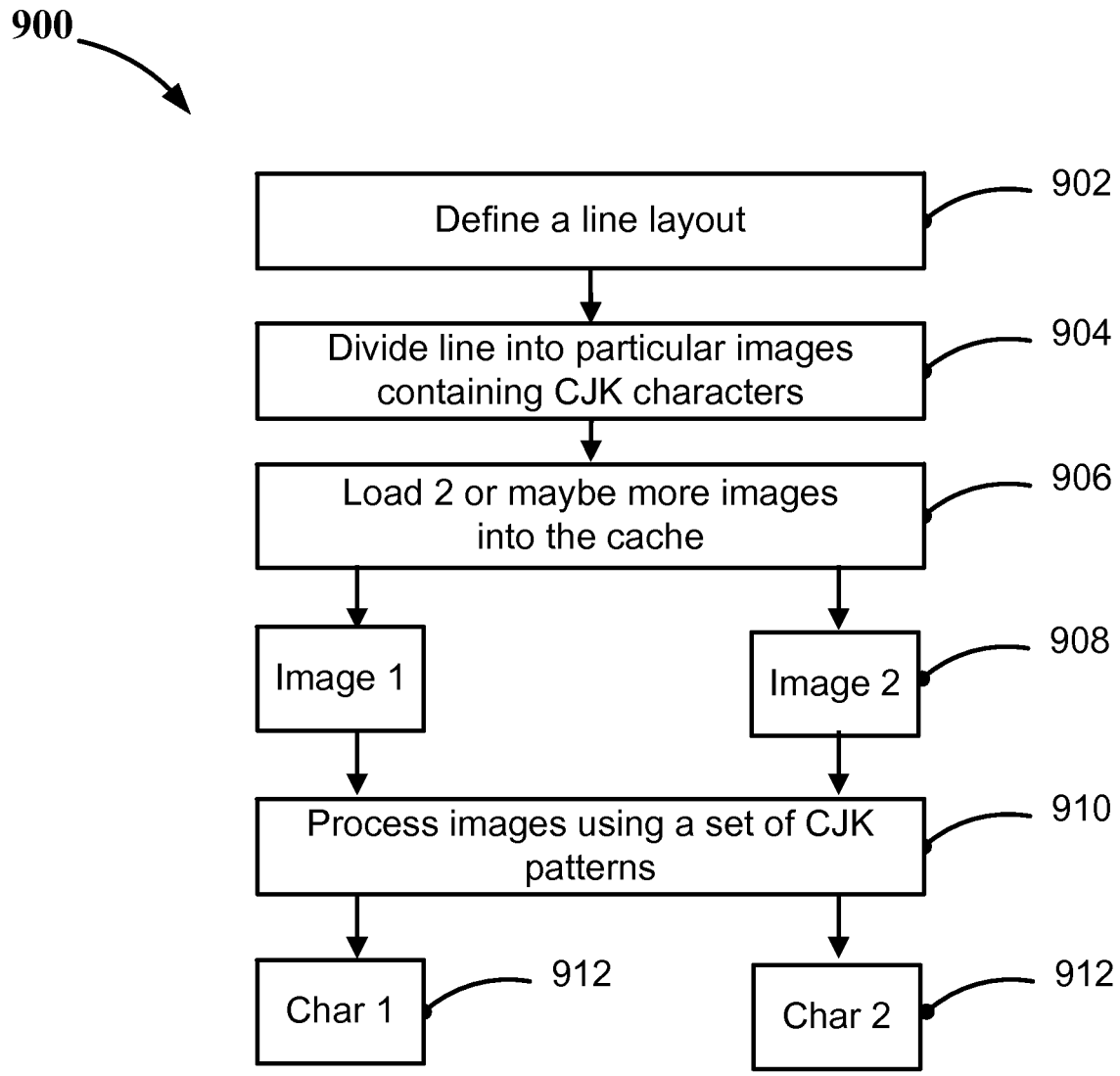
FIG. 9 shows a flowchart of another exemplary implementation of a method for recognizing CJK characters.

FIG. 9 shows a flowchart 900 of a preferred method to recognize two CJK characters with improved speed using a cache in accordance with an embodiment of the invention. The method includes defining the layout of the text line 902 using, for example, steps shown in FIG. 6. The results are defined imaginary borders between characters. Then, at step 904, the line is divided by borders into particular images containing character representations, such that a single image includes at least one character. Preferably, the image contains a single character. Next, two or maybe more of these images are loaded 906 into the computer cache. Then, all loaded images 908 are recognized with the set of CJK patterns 910. The result is a set of two or maybe more recognized characters 912. So the set of CJK patterns is used only once 910 to recognize two characters—one character from each of two images.

Character recognition performed in the described way possibly provides a gain because of a single use of the set of CJK patterns. Texts in CJK languages usually consist of a set of about 30,000 to 40,000 different or possible characters and, correspondingly, these CJK texts need to use a set of 30,000 to 40,000 patterns. Every use of this set of CJK patterns to recognize a single image loaded into the cache needs to process every pattern and would require substantial computational resources and/or would take a long time. Recognition of a plurality of character representations at the same time while they are loaded in the cache needs approximately the same time as the recognition of one character representation.

On the other hand, performing a serial, one by one, recognition of the plurality of character representations needs a serial, one by one, processing of an existing set of CJK patterns. One character representation is loaded into the cache at one time. The result is a processing time that increases proportionally according to the number of characters. The proposed method allows a system or device to process or use the set of CJK patterns only once during recognition of a plurality of character representations, which provides computational and other benefits.

Figure 10:
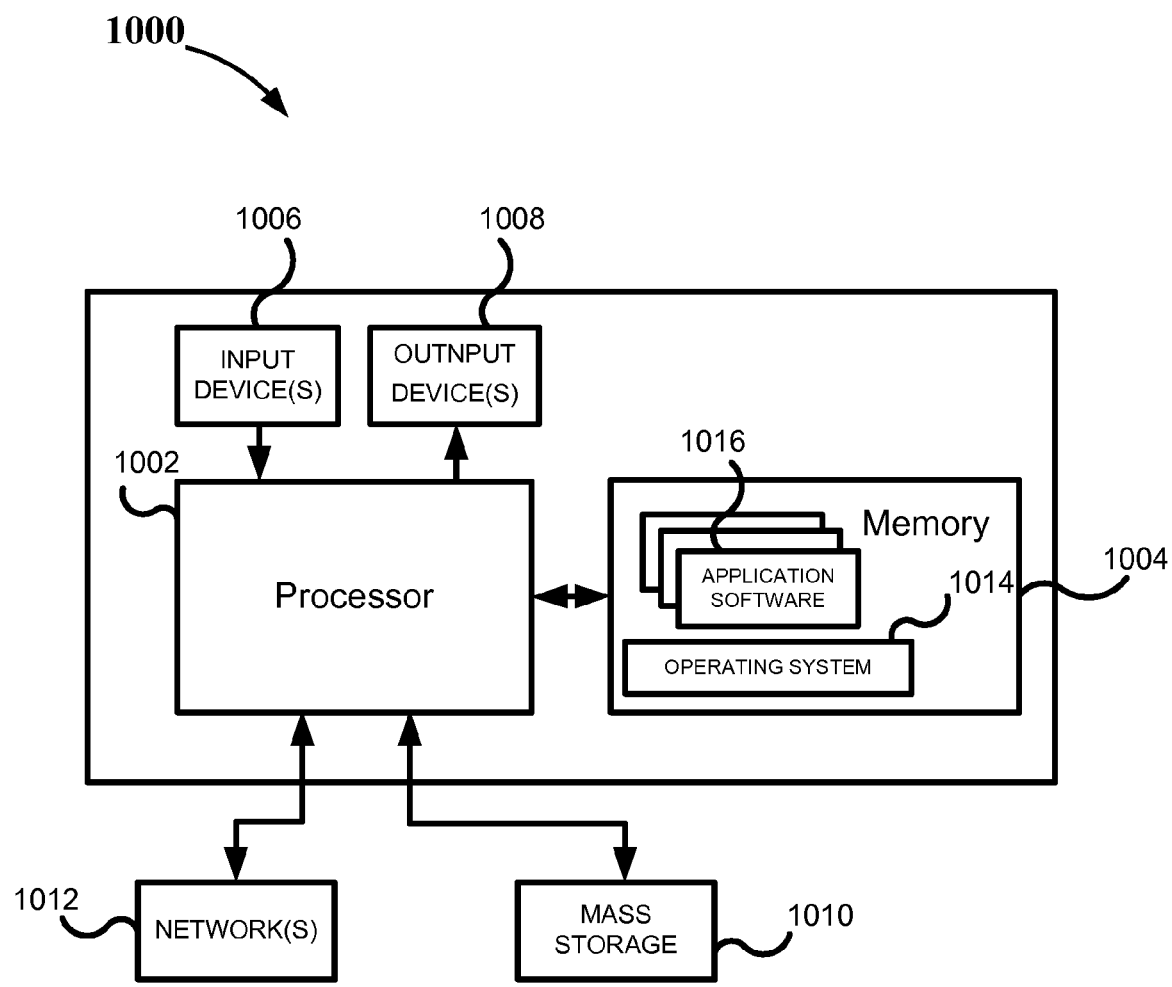
FIG. 10 shows exemplary hardware for implementing a computer system in accordance with one embodiment of the invention.

Referring now to FIG. 10, an example of hardware 1000 that may be used to implement the techniques disclosed herein is shown, in accordance with an embodiment of the present disclosure. The hardware 1000 typically includes at least one processor 1002 coupled to a memory 1004. The processor 1002 may represent one or more processors (e.g., microprocessors), and the memory 1004 may represent random access memory (RAM) devices comprising a main storage of the hardware 1000, as well as any supplemental levels of memory e.g., cache memories, non-volatile or back-up memories (e.g. programmable or flash memories), read-only memories, etc. In addition, the memory 1004 may be considered to include memory storage physically located elsewhere in the hardware 1000, e.g. any cache memory in the processor 1002, as well as any storage capacity used as a virtual memory, e.g., as stored on a mass storage device 1010.

The hardware 1000 also typically receives a number of inputs and outputs for communicating information externally. For interface with a user or operator, the hardware 1000 may include one or more user input devices 1006 (e.g., a keyboard, a mouse, a scanner etc.) and a display 1008 (e.g., a Liquid Crystal Display (LCD) panel). For additional storage, the hardware 1000 may also include one or more mass storage devices 1010, e.g., a floppy or other removable disk drive, a hard disk drive, a Direct Access Storage Device (DASD), an optical drive (e.g. a Compact Disk (CD) drive, a Digital Versatile Disk (DVD) drive, etc.) and/or a tape drive, among others. Furthermore, the hardware 1000 may include an interface with one or more networks 1012 (e.g., a local area network (LAN), a wide area network (WAN), a wireless network, and/or the Internet among others) to permit the communication of information with other computers coupled to the networks. It should be appreciated that the hardware 800 typically includes suitable analog and/or digital interfaces between the processor 1002 and each of the components 1004, 1006, 1008 and 1012 as is well known in the art.

The hardware 1000 operates under the control of an operating system 1014, and executes various computer software applications, components, programs, objects, modules, etc. indicated collectively by reference numeral 1016 to perform the techniques described above.

In general, the routines executed to implement the embodiments of the invention, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations necessary to execute elements involving the various aspects of the invention. Moreover, while the invention has been described in the context of fully functioning computers and computer systems, those skilled in the art will appreciate that the various embodiments of the invention are capable of being distributed as a program product in a variety of forms, and that the invention applies equally regardless of the particular type of machine or computer-readable media used to actually effect the distribution. Examples of computer-readable media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others.

Although the present invention has been described with reference to specific exemplary embodiments, it will be evident that the various modification and changes can be made to these embodiments without departing from the broader spirit of the invention. Accordingly, the specification and drawings are to be regarded in an illustrative sense rather than in a restrictive sense.

While certain exemplary embodiments have been described and shown in the accompanying drawings, it is to be understood that such embodiments are merely illustrative and not restrictive of the broad invention and that this invention is not limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principals of the present disclosure.

I claim:

1. A method for facilitating recognition of glyph-based characters in an electronic image, the electronic image including representations of glyph-based characters, the method comprising:

identifying a line of glyph-based character representations in the electronic image;

isolating a plurality of glyph-based character representations from the line of glyph-based character representations;

loading a set of glyph-based character patterns into a computer memory;

loading the plurality of glyph-based character representations into the computer cache; and recognizing the plurality of glyph-based character representations as a batch using the set of glyph-based character patterns of the computer memory while one or more of the plurality of character representations are in the computer cache.

2. The method of claim 1, wherein the plurality of glyph-based character representations is whole line of glyph-based character representations.

3. The method of claim 1, wherein the plurality of glyph-based character representations is a part of a line of glyph-based character representations.

4. The method of claim 1, wherein isolating the plurality of glyph-based character representations includes:
    detecting character gaps in the line of glyph-based character representations;
    creating a histogram of distances for the detected character gaps;
    constructing a graph according to the detected character gaps;
    assigning a penalty to arcs of the graph wherein the penalty is based in part on the histogram of distances; and
    selecting a path in the graph associated with the character cells based on said penalty and arcs of the graph.

5. The method of claim 4, wherein the graph is a linear division graph (LDG), which is constructed by performing steps including:
    isolating values substantially near maxima values in the histogram of distances, wherein the isolated values are associated with respective detected character gaps;
    creating arcs for each detected character gap;
    assigning a penalty to the arcs;
    creating paths for the LDG;
    calculating aggregate penalties for each path associated with the LDG based on the penalties assigned to the arcs; and
    selecting a desired path from among the paths associated with the LDG based on the aggregate penalties associated with the paths.

6. The method of claim 4, wherein the character gap is a 4-connected path.

7. The method of claim 4, wherein the desired path is a path associated with a smallest value of absolute values of the aggregate penalties.

8. The method of claim 4, wherein the method further comprises:
    determining whether the line of glyph-based character representations includes non-CJK characters by detecting whether any of the arcs associated with the desired path have been assigned a second type penalty.

9. The method of claim 1, wherein the set of glyph-based character patterns is a subset of a macro-set of glyph-based character patterns, wherein the macro-set of glyph-based character patterns are a set of glyph-based character patterns in a storage medium of a device performing said method.

10. The method of claim 1, wherein the computer memory is a network-accessible random access memory.

11. The method of claim 1, wherein the computer memory is a random access memory of a device performing the method.

12. A device for detecting the boundaries of characters in an electronic image, the electronic image including representations of characters, the device comprising:
    a processor; and
    a memory configured with processor-executable instructions which, when executed by the processor, implement a method, the method comprising:
        identifying a line of glyph-based character representations in the electronic image;
        isolating a plurality of glyph-based character representations;
        loading a set of character patterns into the memory;
        loading the plurality of glyph-based character representations into the cache; and
        recognizing the plurality of glyph-based character representations with the set of character patterns while one or more of the plurality of glyph-based character representations are in the cache.

13. The device of claim 12, wherein isolating the first plurality of glyph-based character representations includes:
    detecting character gaps in the line of glyph-based character representations;
    creating a histogram of distances for the detected character gaps; and
    constructing a linear division graph (LDG) according to the detected character gaps by performing steps including:
        isolating values substantially near maxima values in the histogram of distances, wherein the isolated values are associated with respective detected character gaps;
        creating arcs for each detected character gap;
        assigning a penalty to the arcs;
        creating paths associated with the LDG;
        calculating aggregate penalties for each path associated with the LDG based on the penalties assigned to the arcs; and
        selecting a desired path from among the paths associated with the LDG based on the aggregate penalties associated with the paths.

14. The device of claim 13, wherein creating the histogram of distances for the detected character gaps includes:
    [1] setting a window width for the line of glyph-based character representations;
    [2] orienting the window at a current target location associated with the line of glyph-based character representations;
    [3] using the detected character gaps, creating a histogram for the window; and
    [4] repeating steps [1], [2] and [3] for each identified gap.

15. The device of claim 13, wherein the desired path is a path associated with a smallest value of absolute values of the aggregate penalties.

16. The device of claim 12, wherein the assigning of a penalty to the arcs includes assigning a first type penalty or a second type penalty to a respective arc based upon a position of the arc relative to a designated region in the histogram.

17. One or more physical non-transitory computer accessible media encoded with instructions for performing a method, the method comprising:
    identifying a line of glyph-based character representations in the electronic image;
    isolating a plurality of glyph-based character representations;
    loading a set of glyph-based character patterns into a computer memory;
    loading the plurality of glyph-based character representations into the computer cache; and
    recognizing the plurality of glyph-based character representations with the set of glyph-based character patterns while one or more of the plurality of glyph-based character representations are in the computer cache.

18. The one or more physical non-transitory computer accessible media of claim 17, wherein the method further comprises:

detecting character gaps in the line of glyph-based character representations;

creating a histogram of distances for the detected character gaps;

constructing a graph according to the detected character gaps;

assigning a penalty to arcs of the graph wherein the penalty is based in part on the histogram of distances; and selecting a path in the graph associated with the character cells based on said penalty and arcs of the graph.

19. The one or more physical non-transitory computer accessible media of claim 18, wherein the graph is a linear division graph (LDG), which is constructed by performing steps including:

isolating values substantially near maxima values in the histogram of distances, wherein the isolated values are associated with respective detected character gaps;

creating arcs for each detected character gap;

assigning a penalty to the arcs;

creating paths for the LDG;

calculating aggregate penalties for each path associated with the LDG based on the penalties assigned to the arcs; and selecting a desired path from among the paths associated with the LDG based on the aggregate penalties associated with the paths.

\* \* \* \* \*